(12) United States Patent
Weinel

(10) Patent No.: US 7,083,487 B2
(45) Date of Patent: Aug. 1, 2006

(54) EMERGENCY FLOTATION AND RECOVERY DEVICE

(76) Inventor: John Weinel, 21025 Heron Way, Lakeville, MN (US) 55044

( * ) Notice: Subject to any disclaimer, the term of this patent is extended or adjusted under 35 U.S.C. 154(b) by 0 days.

(21) Appl. No.: 10/817,451

(22) Filed: Apr. 2, 2004

(65) Prior Publication Data
US 2005/0221700 A1 Oct. 6, 2005

(51) Int. Cl.
B63C 9/08 (2006.01)

(52) U.S. Cl. .................................. 441/88; 441/131

(58) Field of Classification Search .............. 441/80, 441/81, 43, 131, 88; 180/271; 701/45
See application file for complete search history.

(56) References Cited

U.S. PATENT DOCUMENTS

| | | | |
|---|---|---|---|
| 4,560,356 A * | 12/1985 | Burr | 441/80 |
| 4,973,278 A * | 11/1990 | Williams | 441/131 |
| 5,150,662 A | 9/1992 | Boyd et al. | |
| 5,682,832 A | 11/1997 | Millard | |
| 5,888,111 A | 3/1999 | Walker | |
| 6,070,546 A | 6/2000 | Downey et al. | |
| 6,347,970 B1 | 2/2002 | Weinel | |
| 6,352,460 B1 | 3/2002 | Eiband et al. | |
| 6,394,867 B1 * | 5/2002 | Bianco | 441/126 |
| 6,800,007 B1 * | 10/2004 | Calkin | 441/84 |

OTHER PUBLICATIONS

"Air track Inflatable Rescue Walkway", www.paratech.us, Paratech Inc., Sep. 2003.

* cited by examiner

Primary Examiner—Jesus D. Sotelo
(74) Attorney, Agent, or Firm—Schwegman, Lundberg, Woessner & Kluth, P.A.

(57) ABSTRACT

An emergency rescue and recovery device includes a portable bundle with an inflatable bladder in a storage position. In one example, the inflatable bladder has a substantially toroid geometry when inflated. The portable bundle further includes a gas canister in communication with the inflatable bladder, and an opening mechanism coupled to the gas canister. A tether is coupled to the inflatable bladder. A manual trigger is coupled to the opening mechanism, and is operable to initiate inflation of the bladder. Optionally, the portable bundle includes a pouch and at least the inflatable bladder, the gas canister, and the opening mechanism are disposed within the pouch. A method for using an emergency rescue and recovery device includes coupling the portable bundle to a vehicle or person. A manual trigger is operated to inflate the bladder. The method includes inflating the bladder into a substantially toroid geometry splitting the enclosure.

47 Claims, 10 Drawing Sheets

EMERGENCY FLOTATION AND RECOVERY DEVICE

CROSS REFERENCE TO RELATED PATENTS

This document is related to Weinel U.S. Pat. No. 6,347,970, entitled "DEPLOYABLE RECOVERY SYSTEM FOR SNOWMOBILE AND RIDER," filed on Aug. 22, 2000.

TECHNICAL FIELD

The present invention relates generally to emergency recovery devices and in particular to portable emergency flotation and recovery devices usable with personal recreational vehicles and riders.

BACKGROUND

Many of the current recovery and rescue devices are not compact and portable. For instance, the devices are often affixed to vehicles and include supporting equipment housed within the vehicle (e.g. sensors, compressed gas tanks, etc.). Often, the rescue and recovery devices are configured to provide flotation for the vehicle. Personal vehicles, for example, snowmobiles and all terrain vehicles (ATVs), can weigh over 500 pounds. Additionally, these devices are often designed to float the driver and/or a rider. The weight of these vehicles and their riders requires a corresponding device that can provide enough buoyancy to float the vehicles and the driver and/or riders. In many circumstances, the devices are large and bulky and must be fixedly mounted onto the vehicle. The size and weight of these devices substantially precludes use as a portable recovery and rescue device.

One example of a mounted recovery and rescue device includes multiple inflatable bladders mounted around a snowmobile. When a water detection device is exposed to water, the inflatable bladders are inflated to float the snowmobile and the riders. One disadvantage of this type of device is that the device is securely coupled to the snowmobile to ensure an even floatation is provided around the snowmobile. If the vehicle was not already so equipped, it would be difficult in an emergency situation to quickly couple such a device to a personal vehicle to effect a rescue. Another disadvantage is the size and weight of the device. The inflatable bladders require gas canisters, multiple means for affixing each inflatable bladder to the snowmobile, and at least one water detection device. Such a recovery device including all of the described components would be difficult to quickly couple to the vehicle or person for use in a rescue. Moreover, inflatable bladders affixed to a vehicle would not aid in recovery of the vehicle or riders from a slide of material, for example, an avalanche.

Another type of recovery and rescue device uses inflatable bladders between two panels to raise immobile objects or an incapacitated person. A disadvantage of this type of device is that it must be placed underneath an object or person to effect flotation. In other words, the device must be moved out to the object or person, then placed underneath, and then inflated. In some circumstances a drowning person panics and it becomes difficult to place any sort of rescue device beneath him. Further, some vehicles are too heavy to place such a device underneath. Additional equipment including a hoist is needed to use the device in such an instance. Moreover, in cold water rescues placing this device beneath a person or a vehicle would be dangerous for the rescuer. Further still, inflatable bladders disposed between panels would likely not aid in recovery of the vehicle or riders from a slide of material, for instance an avalanche or mud slide.

What is needed is an flotation device that overcomes the shortcomings of previous flotation devices. What is further needed is an flotation device that is compact and portable and quickly couplable to a vehicle or person to effect a rescue and/or a recovery of a vehicle.

SUMMARY

The emergency flotation and recovery device described herein provides a relatively light and compact device that can be quickly moved and coupled to a vehicle or person for use in a rescue situation. In one example, the inflatable bladder, gas canister, and the opening mechanism for the gas canister are stored within an enclosure (e.g. a pliable pouch) as a portable bundle. The device includes a tether coupled to the inflatable bladder that is quickly couplable to a person, or a personal vehicle (e.g. all terrain vehicle (ATV), snow mobile, or the like). In another option, the device includes straps for releasable coupling to the person or personal vehicle that are used for storage of the device. The device does not need to be removed from a case or installed on the vehicle for use. In one option, when needed, the inflatable bladder is inflated by pulling a manual rip cord. As the inflatable bladder expands it splits apart the enclosure to assume the substantially toroid geometry.

Once inflated, in one option, the device suspends the personal vehicle within a liquid such as water for instance. In one example, the inflatable bladder floats within a break in ice while the personal vehicle is suspended below. In another example, a person or persons can climb through the orifice of the toroid inflatable bladder to get on top of the inflatable bladder and out of the water. In still another example, the personal vehicle suspended by the inflatable bladder serves as a sea anchor to substantially prevent undesirable sideway motion of the inflatable bladder. In yet another example, the orifice of the toroid inflatable bladder fills with avalanche material (snow, mud or the like) and provides drag to the vehicle or person. In one option, the drag of the toroid inflatable bladder substantially prevents cartwheeling of the vehicle during an avalanche.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
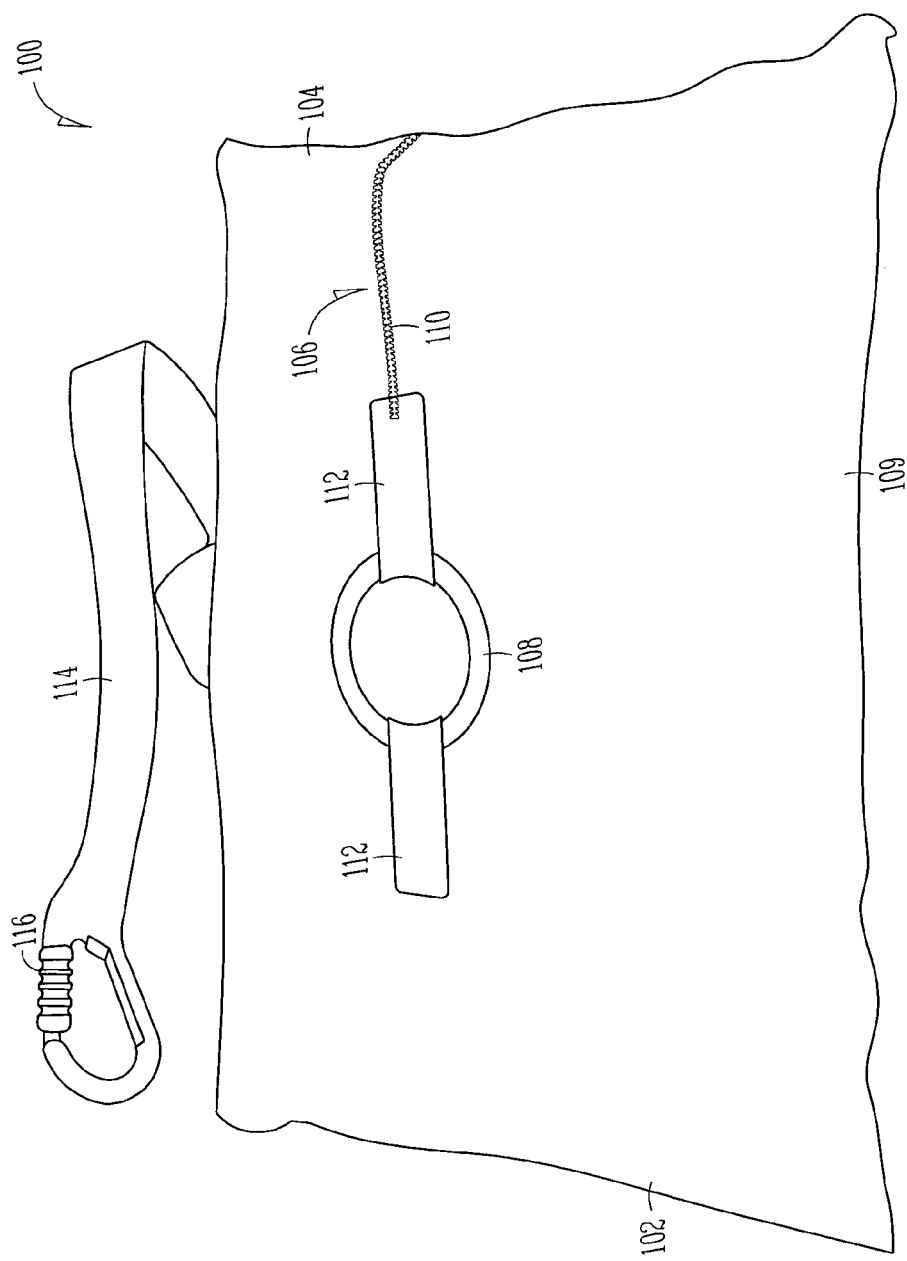
FIG. 1 is a perspective view illustrating a recovery device constructed in accordance with one embodiment.

FIG. 1 shows one example of a recovery device 100. The recovery device 100 includes a portable bundle 102. In one example, the portable bundle 102 includes a pouch 104 constructed with, but not limited to, a pliable material. The pouch 104 includes nylon, canvas or the like. The pouch 104 encloses an inflatable bladder, at least one gas canister and an opening mechanism for inflating the inflatable bladder, described below. In another example, the pouch 104 surrounds and stores components of the recovery device 100 to form the portable bundle 102. The portable bundle 102 is a compact device that is easily moveable between vehicles (e.g. from a car to an all-terrain vehicle) and couplable to a personal vehicle or person. In one option, the recovery device 100 weighs about 16 pounds and is approximately 16 inches long, 12 inches wide and 4 inches deep. In another option, the pouch 104 is a casing dimensioned and configured to enclose the inflatable bladder, at least one gas canister and the opening mechanism.

A manual trigger 106 is coupled at one end to the opening mechanism. In another example, the manual trigger 106 includes a pull ring 108 coupled to a rip cord 110. In one option, an end of the rip cord 110 is coupled to the opening mechanism within portable bundle 102. In yet another example, the manual trigger 106 includes a strap or the like coupled to the opening mechanism. The pull ring 108 is coupled to a first side 109 of the pouch 104 with hook and loop material, in another option. Tabs 112 including hook and loop material are coupled around the pull ring 108. Corresponding hook and loop material is coupled to the outer surface of the pouch 102. The pull ring 108 is retained against the pouch 104 in a stored position and is pulled when needed to inflate the inflatable bladder.

A tether 114 extends from within the pouch 104. In one example, the tether 114 is coupled to the inflatable bladder and extends through the material of the pouch 104. The tether 114 includes, but is not limited to a durable pliable material, for example nylon. The tether 114 is of sufficient strength to support a weight of at least 600 pounds. In another example, the tether 114 is fastened along its length to the pouch 104. In one option, hook and loop material or the like is disposed along the tether 114 and corresponding hook and loop material or the like is disposed on the pouch 104. At least a portion of the tether 114 is coupled to the pouch 104. Coupling at least a portion of the tether 114 to the pouch 104 immobilizes a segment of the tether 114, between the point of coupling to the pouch 104 and the point of coupling to the inflatable bladder. Immobilizing the segment of the tether 114 substantially prevents disturbance of the inflatable bladder in its stored position within the pouch 104, in one example.

In another example, the tether 114 includes a fastening clasp, for example a carabiner 116, ring clasp, lobster clasp or the like. Optionally, the carabiner 116 includes a self-locking feature to maintain the carabiner 116 in a closed position, for instance, where the carabiner 116 is coupled to a personal vehicle or person. The self-locking feature is moveable and covers the juncture between a hoop of the carabiner 116 and a closing pin when the closing pin is in the closed position and engaged to the hoop.

Figure 2:
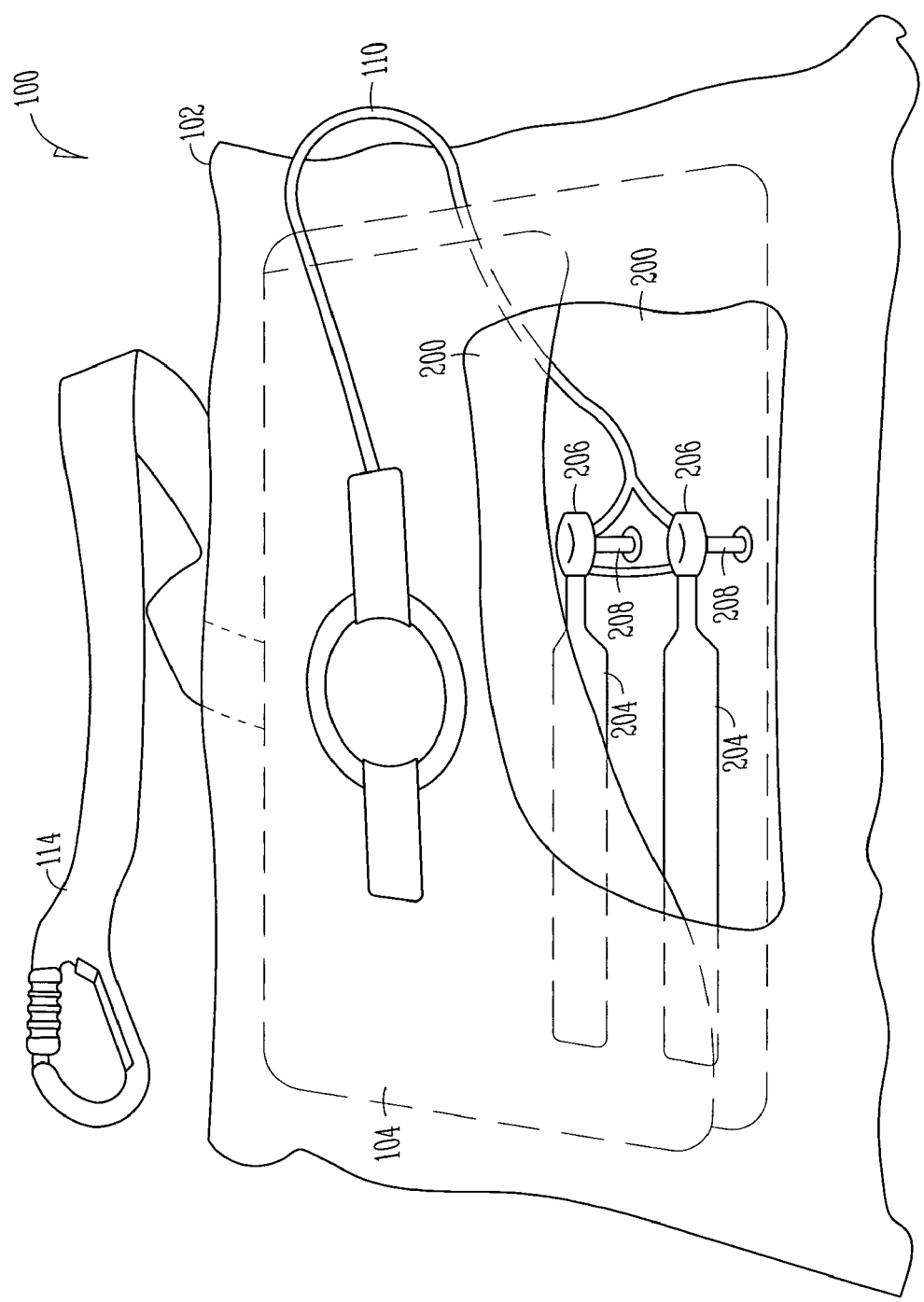
FIG. 2 is partial sectional view illustrating a recovery device constructed in accordance with one embodiment.

FIG. 2 is a partial sectional view of the recovery device 100. An inflatable bladder 200 is enclosed within the pouch 104 of portable bundle 102. The tether 114 is coupled at one end to the inflatable bladder 200. The inflatable bladder 200 is folded into a storage position. When in the storage position, the inflatable bladder 200 fits within the pouch 104. In one example, the inflatable bladder 200 is dimensioned and configured to have a shape substantially corresponding to the dimensions of the pouch 104 when the inflatable bladder 200 is in the storage position. The inflatable bladder 200 is folded over at least one gas canister 204, a corresponding opening mechanism 206 and a portion of the rip cord 110. The example of the recovery device 100 shown in FIG. 2 includes two gas canisters 204 and two opening mechanisms 206. The gas canisters 204 and the opening mechanisms 206 are enclosed within the pliable inflatable bladder 200 and substantially protected from damage caused by, for instance, dropping of the portable bundle 102, impacts, or the like. The inflatable bladder 200 serves to protect the gas canisters 204 and the opening mechanisms 206 during transport of the recovery device to a personal vehicle or person. Additionally, folding the inflatable bladder 200 over the gas canisters 204 and the opening mechanisms 206 substantially protects the recovery device from damage when stored, for example, within a vehicle trunk or bed of a truck. The inflatable bladder 200, in one example, is made with or includes a polymer suitable for use in water or snow and is gas impermeable. In another example, the inflatable bladder includes polyethylene, polypropylene, polyester, polyurethane, polyvinyl chloride or the like. In yet another example, a suitable polymer is combined with a nylon or aramid fiber.

The gas canisters 204 shown in FIG. 2 store a compressed gas, for instance carbon dioxide, air or the like. In one example, the gas canisters 204 are retained within a sleeve and the sleeve is coupled to the inflatable bladder 200. The sleeve secures the gas canisters 204 against the inflatable bladder 200. The sleeve, in one option, is made with or includes the same material included in the inflatable bladder 200. The gas canisters 204 are coupled to respective opening mechanisms 206, for example, by screwing the canisters 204 into corresponding threaded receptacles of the opening mechanisms 206. In another example, the canisters 204 are coupled to the opening mechanisms 206 by welds, interference fits, or the like. The opening mechanisms 206 are coupled to the rip cord 110. The opening mechanisms 206 are coupled by fittings 208 to the inflatable bladder 200. The fittings 208 provide fluid communication between the gas canisters 204 and the inflatable bladder 200. The fittings 208, in one example, are constructed with or include stainless steel, steel, aluminum or the like. In another example, the fittings 208 include rubber, polyurethane, polyvinyl chloride or the like. The rip cord 110 is operable to actuate the opening mechanisms 206 and allow communication of the gas within gas canisters 204 to the inflatable bladder 200 via the fittings 208.

Figure 3:
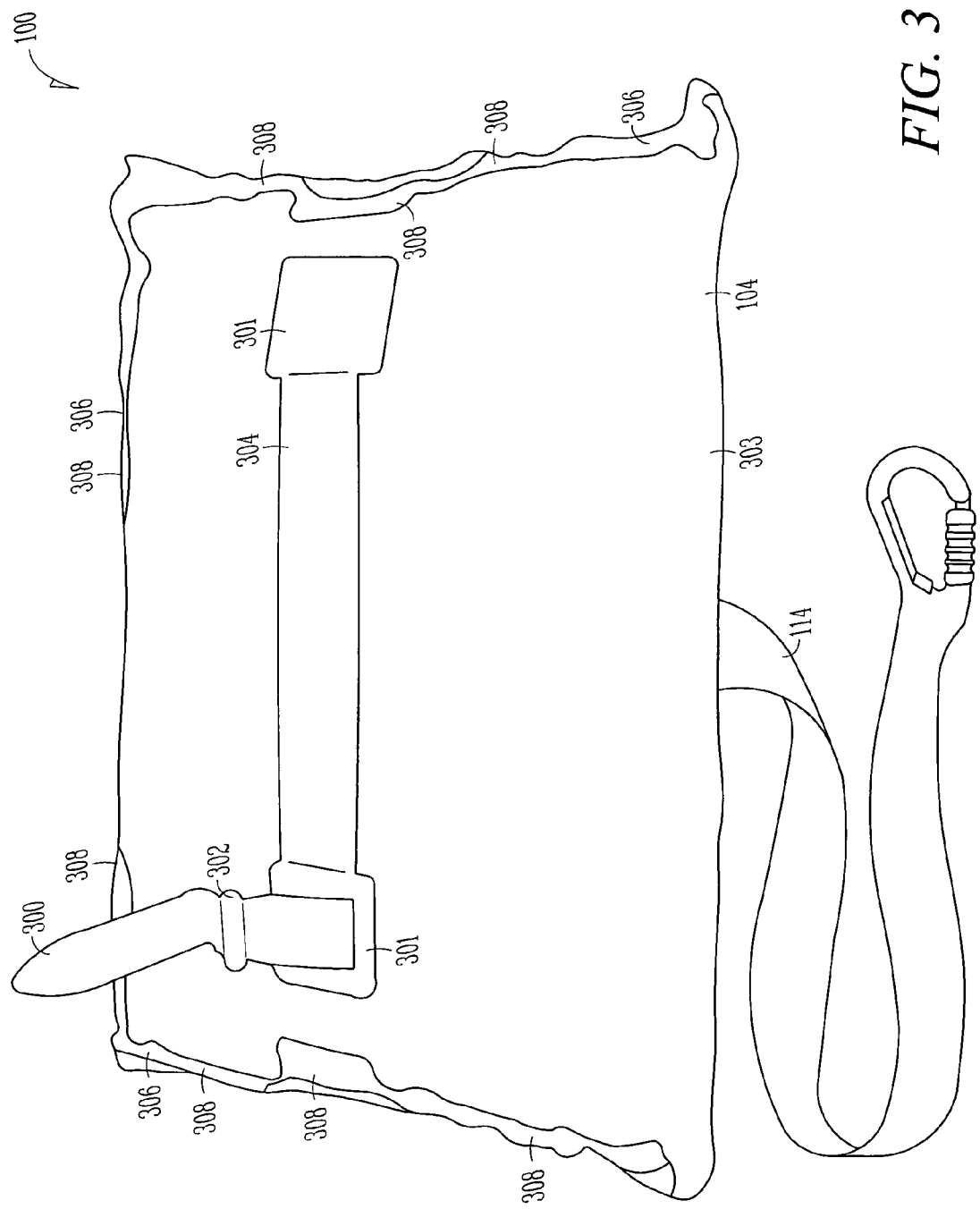
FIG. 3 is a perspective view illustrating another side of a recovery device constructed in accordance with one embodiment.

FIG. 3 is a perspective view of a second side 303 of the recovery device 100. In one example, at least one strap 300 is coupled to the pouch 104. The strap 300 is fed through a strap fitting 301 that couples the strap 300 to the pouch 104, in another example. In one option, the strap 300 is placed around a hard point on a personal vehicle (e.g. a storage rack or handlebar) to tie the recovery device 100 to the vehicle. In another option, the strap is placed around a person or a piece of equipment, for example a rucksack or the like. The strap 300 includes a buckle 302, and the strap 300 is fed through the buckle 302 after placing the strap around the vehicle hard point, for example. To snugly tie the recovery device to the personal vehicle or person the strap 300 is tightened through the buckle 302. The strap 300 is immobilized when tightened to prevent loosening around the hard point or person. Optionally, hook and loop material, buttons or the like are used to immobilize the strap 300. The hook and loop material, in one example, is disposed along the strap 300. When immobilization of the strap 300 is desired, the strap 300 is folded back along itself to couple the hook and loop material and immobilize the strap 300.

The recovery device 100 includes a carry strap 304, in another example. The carry strap 304 optionally extends between two strap fittings 301 and is coupled along with the strap fittings 301 to the pouch 104. The carry strap 304 is constructed with nylon, canvas or the like and has sufficient strength to allow carrying of the recovery device 100 in transport to a personal vehicle or person.

The pouch 104 includes at least one seam 306. The at least one seam 306 joins the sides of the pouch 104 so the pouch 104 substantially encloses the inflatable bladder 200, at least one gas canister 204 and the opening mechanism 206. In one example, the seam 306 extends at least part way around the pouch 104. In another example, the seam 306 extends around the pouch 104. In still another example, the seam 306 extends part way around the pouch 104 so as the pouch 104 is split during inflation, the pouch 104 does not restrict the inflation of the inflatable bladder 200. The seam 306 is sized and shaped to split during inflation of the inflatable bladder 200 to allow the bladder 200 to expand to its fully inflated geometry. In one option, the seam 306 separates during inflation and the pouch 104 remains coupled to the tether 114, as described above. The inflatable bladder 200 is free to move away from the pouch 104 and only restricted by the coupling of the tether 114 to a personal vehicle or a person. In another option, the pouch 104 remains coupled to the personal vehicle or person with the strap 300 as the inflatable bladder 200 expands and splits the seam 306. The seam 306 splits, for example, under a tension force applied across the pouch 104 during inflation. In one example, fasteners 308, such as hook and loop material, ties, rivets or the like are coupled along the seam 306 between the sides 109, 303 of the pouch 104. The fasteners 308 couple the side 109 to side 303. The fasteners 308 are sized and shaped to split under the tension force applied across the pouch 104 by inflation.

Figure 4:
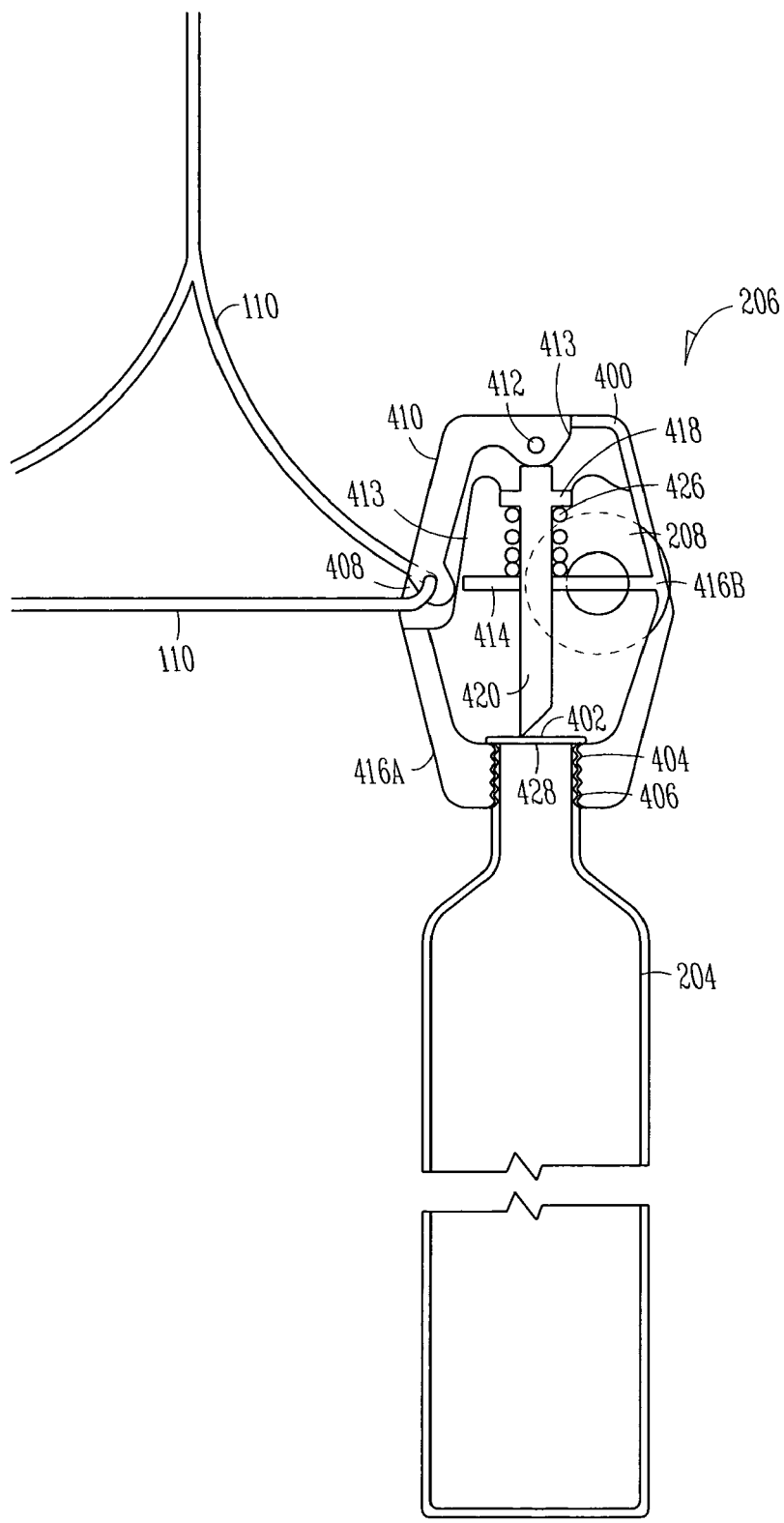
FIG. 4 is a cross-sectional view illustrating an opening mechanism for a recovery device constructed in accordance with another embodiment.

FIG. 4 is a cross-sectional view of the opening mechanism 206. The opening mechanism 206 includes a housing 400 surrounding the components used to open the gas canister 204. The housing 400 includes a socket 402 dimensioned and configured to receive and couple with the gas canister 204. The housing 400 includes a fastener (e.g. threading, adhesive, set screw or the like) for securing the gas canister 204 to the housing 400. In one example, the housing 400 includes threads 404 around the socket 402 and the gas canister 204 includes corresponding threads 406.

The rip cord 110 is laced through an opening 408 of the housing 400. In one example, the rip cord 110 is fed through one end of an arm 410. Another end of the arm 410 is rotatably coupled to the housing 400. The arm 410, in one option, is coupled to the housing 400 with a pin 412 that extends through the arm 410 and is secured within the housing 400. The arm 410 includes, in another option, a cam 413. The arm 410 is made with or includes steel in one option. A seat 414 is coupled to the housing 400 and extends substantially between the opposing sides 416A, 416B of the housing 400. A puncturing device, for instance a needle 420 or the like is moveably coupled to the seat 414. One end of the needle 420 is substantially adjacent to the cam 413 of the arm 410. The needle 420 includes a flange 418 substantially adjacent to the one end. An elastic member, for example a spring 426 or the like, is coupled at an end to the flange 418 and at another end to the seat 414. The spring 426 is in a compressed state when held between the flange 418 and the seat 414. The needle 420 is thus suspended above a diaphragm 428 of the gas canister 204 before puncturing of the diaphragm 428. In one example, the diaphragm 428 is a thin membrane of the same material used in the construction of the gas canister. In another example, the diaphragm 428 includes different materials of sufficient strength (e.g. plastics, composites or the like) to withstand the pressure of the pressurized gases within the gas canister 204. A pliable seal 413 extends between the housing 400 and the needle 420, in yet another example. The pliable seal 413 is constructed with or includes rubber, silicone rubber or the like.

The spring 426 provides a compressive force sufficient to engage the needle 420 against the cam 413. Movement of the arm 410 around the pin 412, for example by pulling the rip cord 110, forces the cam 413 to move the needle 420 as a follower. Sufficient rotation of the arm 410 drives the needle 420 into the diaphragm 428 and punctures the same. Puncturing the diaphragm 428 allows the gas canister 204 to expel its gas content into the housing 400. In one example, the compressed spring 426 pushes on the flange 418 of the needle 420 and pushes the needle 420 out of the diaphragm 428 to allow the gas to enter the housing 400. In another example, the needle 420 is hollow and includes a passage from the needle tip to an opening in the needle 420 to allow the gas into the housing 400. The gas enters the opening mechanism 206 and travels through the fitting 208 into the inflatable bladder 200. Because the housing 400 is sealed by the engagement of the gas canister 204 to the housing and the seal 413 the pressurized gas escapes into the inflatable bladder 204.

In another example, the rip cord 110 is coupled to two arms 410. A second arm 410 is disposed within another housing 400 for a separate gas canister 204, as shown in FIG. 2. Pulling of the rip cord 110 moves the arms 410 and cams 413 drive the needles 420 into diaphragms 428. As a result both gas canisters 204 are punctured and the inflatable bladder 200 is filled with gas from both canisters 204.

Figure 5:
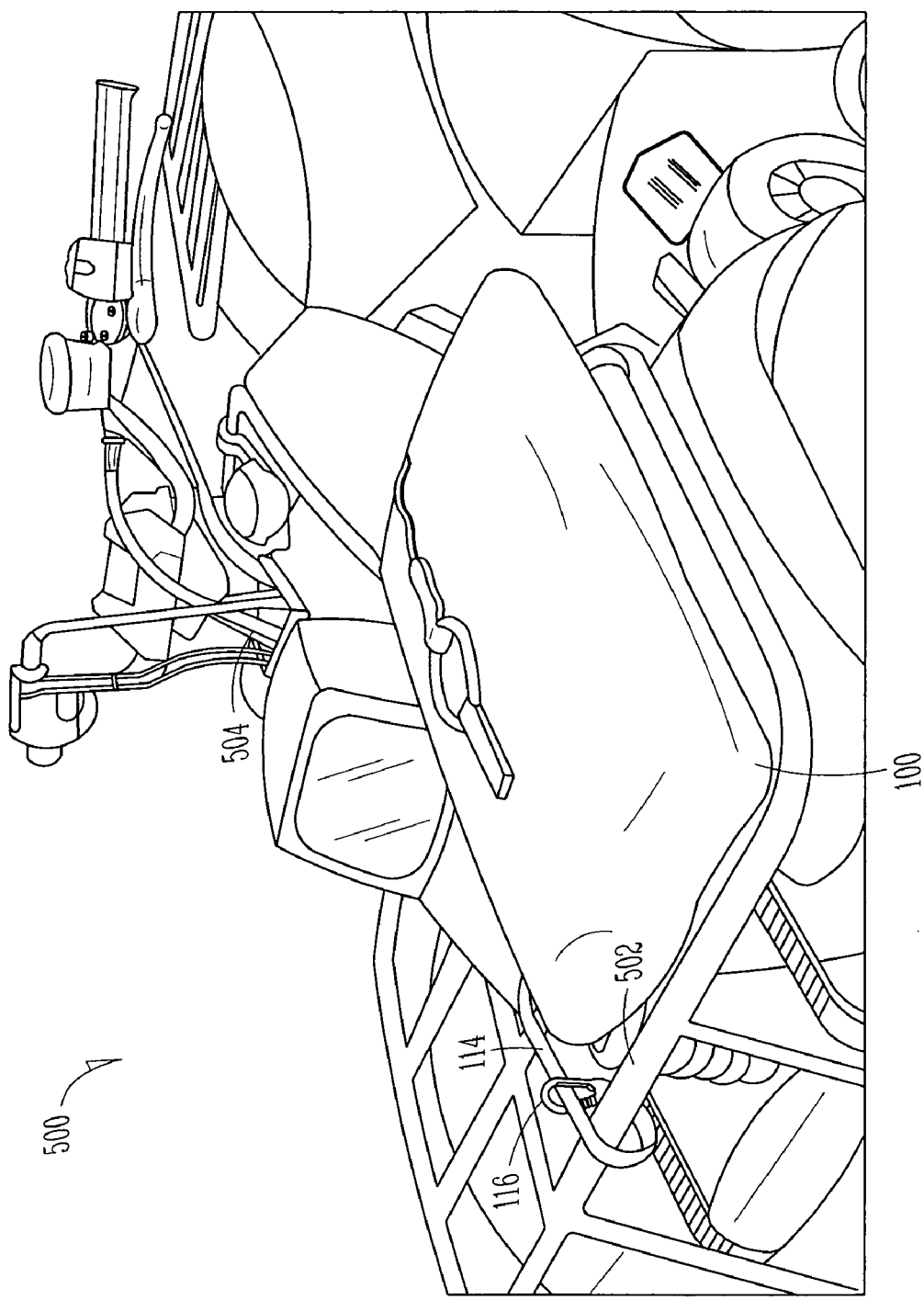
FIG. 5 is a perspective view illustrating a recovery device coupled to a personal vehicle.

FIG. 5 is a perspective view of a personal vehicle 500, in this example an all-terrain vehicle (ATV), with the recovery device 100 coupled thereto. The tether 114 is looped around, for example, a portion of a storage rack 502, as shown in FIG. 5. The carabiner 116 is disposed around the tether 114 to create a closed loop and couple the recovery device 100 to the personal vehicle 500. In another example, the tether 114 and carabiner 116 are tied around a steering column 504 of the personal vehicle 500. In yet another example, the carabiner 116 is disposed around a portion of the personal vehicle 500 (e.g. the storage rack 502) to couple the recovery device 100 to the vehicle 500. The strap 300 is optionally coupled to the personal vehicle 500, as described above (see FIG. 3). The strap 300 is used to secure the portable bundle 102, to the personal vehicle 500. The strap 300 (including additional straps 300 if so desired) is operable to store the recovery device 100 on the personal vehicle 500. The tether 114 is operable to couple the inflatable bladder 200 to the personal vehicle 500. Optionally, the tether 114 and carabiner are used to couple the inflatable bladder 200 to a person. In another option, the strap 300 is used to secure the portable bundle 102 to a person (i.e. a ruck sack, back pack, article of clothing or the like).

Figure 6:
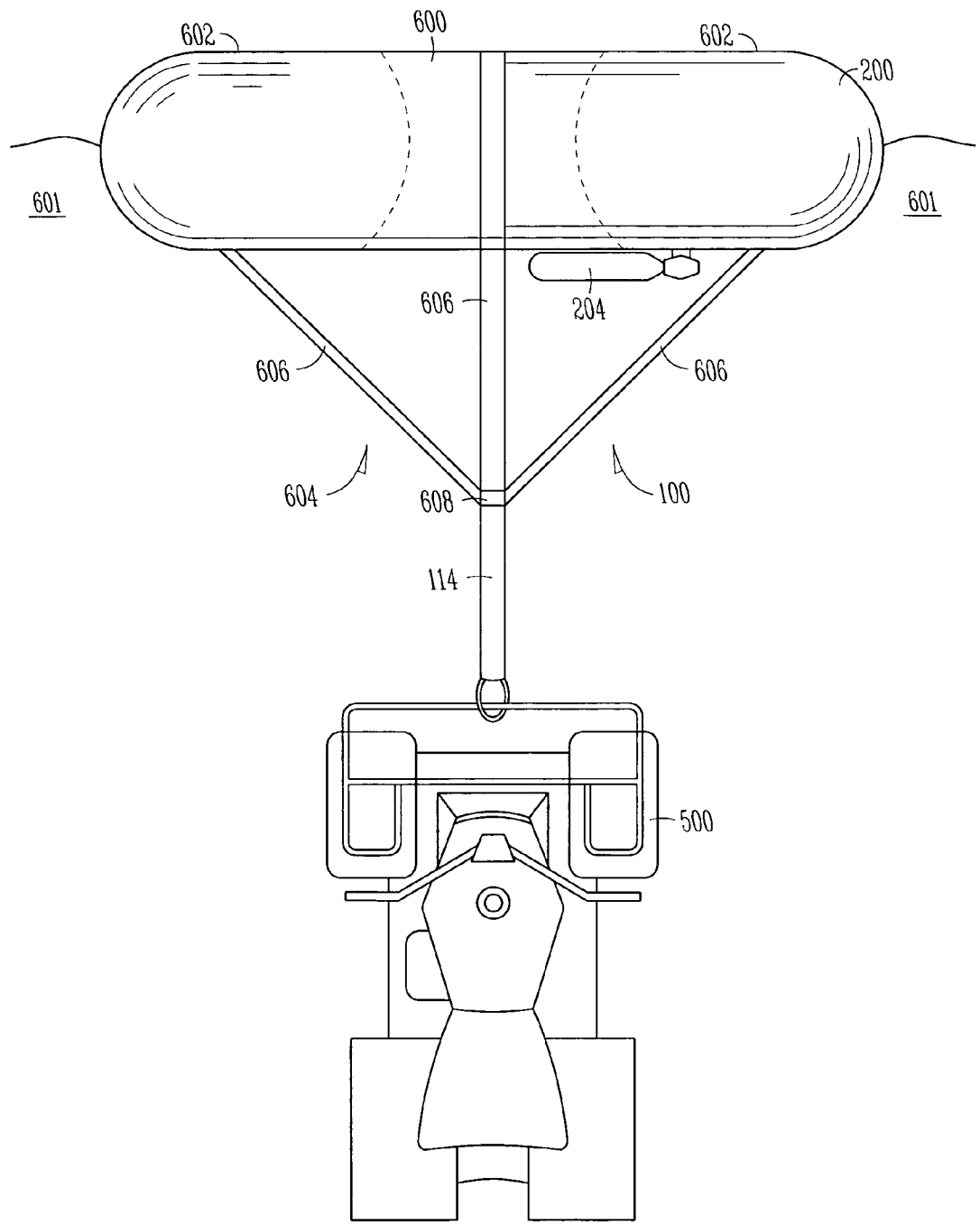
FIG. 6 is a side view illustrating a recovery device in an inflated condition suspending a personal vehicle.

FIG. 6 is a side view of the recovery device 100 deployed and coupled to a personal vehicle 500. In the example shown the personal vehicle 500 is submerged in a liquid 601 (e.g. water). The inflatable bladder 200 is sufficiently inflated by the gas canisters 204 to support the submerged weight of the personal vehicle 500 and the weight of a driver and passengers. The inflatable bladder 200, in one example has a toroid shape and includes an orifice 600. The orifice 600 ensures that a rider or driver has access to the non-submerged upper side 602 of the bladder 200 when attempting to climb out of the liquid 601. In one example, where the inflatable bladder 200 fills a hole in ice the orifice 600 allows a person to climb onto the upper side 602 of the bladder 200. In another example, where ice fills the area around the inflated bladder 200, the orifice 600 provides for egress out of the liquid 601.

The inflatable bladder 200 is coupled to the tether 114 with a restraint assembly 604. The restraint assembly 604, in one example includes belts 606 constructed with materials having tensile strength sufficient to support the suspended vehicle 500. In another example, the belts 606 include nylon or the like. The tether 114 is coupled with the belts 606 of the restraint assembly 604 substantially below the orifice 600. The belts 606 are dimensioned and configured, in one option, to position the tether 114 and suspended personal vehicle 500 below the orifice 600. In another option, the belts 606 converge at a junction 608 to couple with the tether 114. The submerged personal vehicle 500 acts like a sea anchor and stabilizes the inflatable bladder 200 so drivers, passengers, victims or the like may climb onto the non-submerged upper side 602 of the personal vehicle 500. In another option, the weight of the suspended personal vehicle 500 substantially prevents flipping of the inflatable bladder 200 within the liquid and allows drivers, passengers, victims or the like to climb onto the upper side 602 without flipping the bladder 200. In still another option, the suspended personal vehicle 500 substantially prevents lateral motion of the inflatable bladder 200 when the bladder 200 is in the liquid 601.

Figure 7:
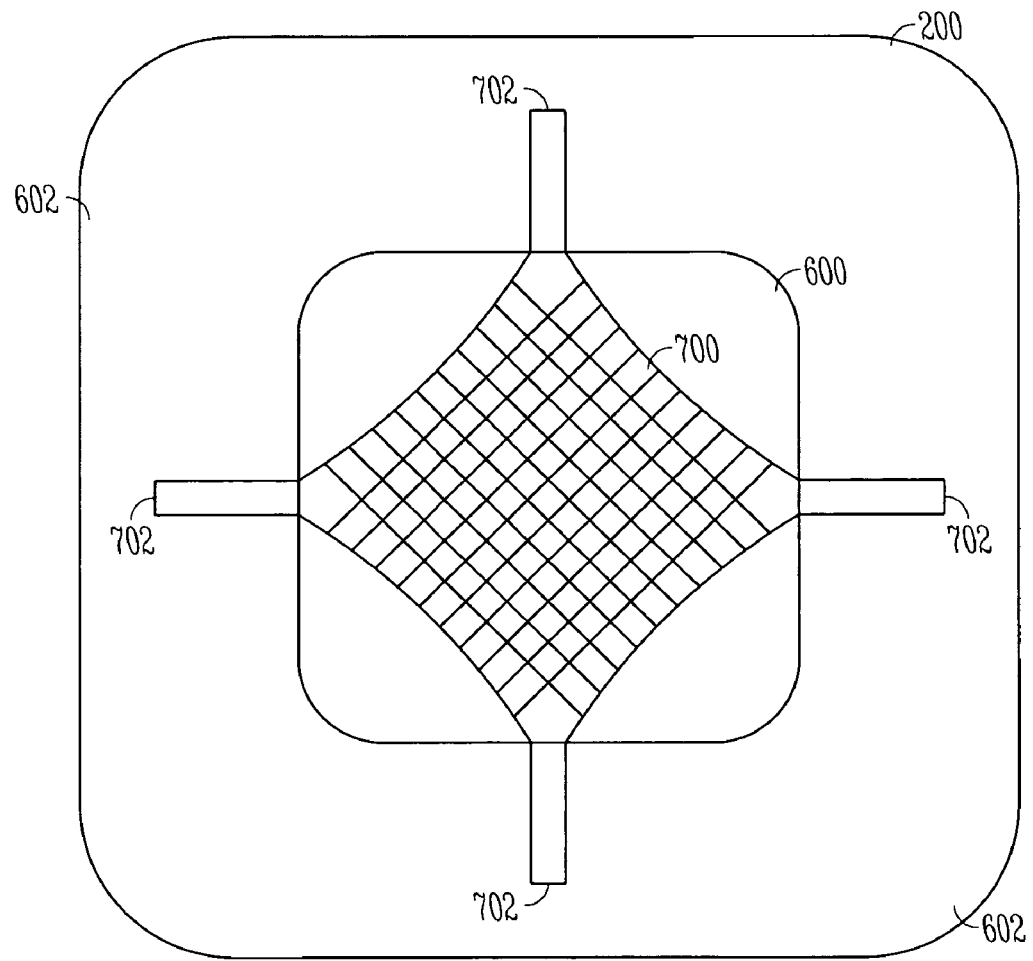
FIG. 7 is a top view illustrating an inflatable bladder in an inflated condition.

FIG. 7 is a top view of the inflatable bladder 200 in an inflated condition. As described above, the inflatable bladder has a toroid geometry and defines an orifice 600. In one example, a web 700 is coupled to the inflatable bladder 200 and extends across at least a portion of the orifice 600. The web 700, in another example, is removably coupled to the inflatable bladder 200. Optionally, the web 700 is removably coupled to the inflatable bladder 200 with hook and loop material 702, buttons or the like. The web 700 is sized and shaped to be removed, in one example, by a person attempting to climb through the orifice 600 to the upper side 602 of the bladder 200. In another example, the web 700 and/or hook and loop material 702 is sized and shaped to remain coupled to the inflatable bladder 200 if a person applies at least a portion of his body weight on the web 700, for instance if the person lays on the web 700. The web 700 aids in preventing an unconscious or paralyzed individual from falling through the orifice 600 into freezing water or the like.

Figure 8:
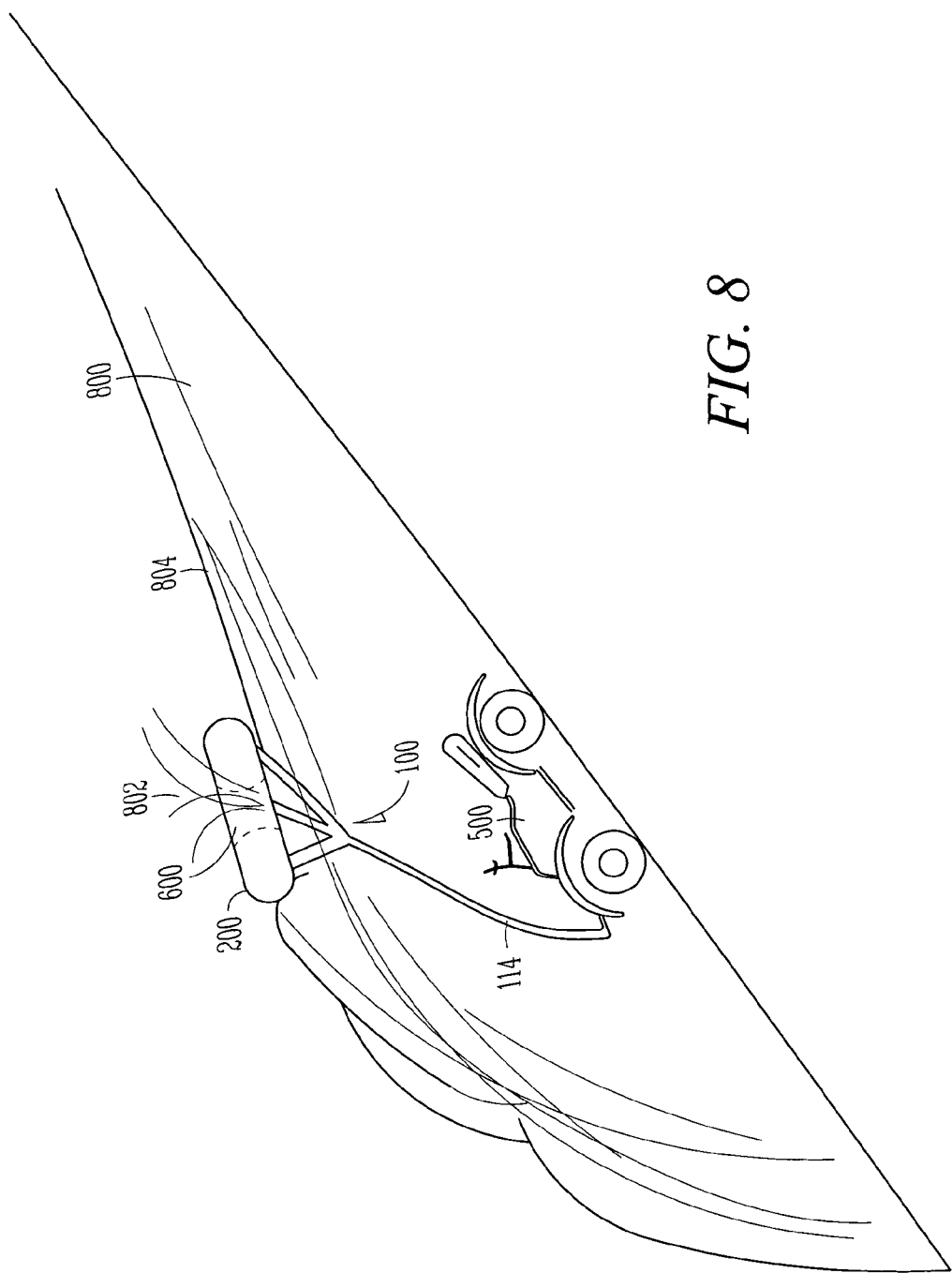
FIG. 8 is a side view illustrating a recovery device in an inflated condition in a material slide.

FIG. 8 is a side view illustrating a recovery device 100 in an inflated condition in a material slide 800. The inflatable bladder 200 is inflated in a material slide 800 (e.g. an avalanche, mud slide or the like). The relatively light inflatable bladder 200 moves to the top of the material slide 800 and provides drag to the personal vehicle 500 or the person the bladder 200 is coupled to with tether 114. The orifice 600 fills with slide material 802 to provide additional drag. In another option, slide material 802 that falls onto the inflatable bladder 200 settles beneath the inflatable bladder 200 through the orifice 600 allowing the inflatable bladder 200 to move to the upper surface 804 of the material slide 800. The inflatable bladder 200, in another example, suspends the personal vehicle 500 just below the upper surface 804 along the tether 114. Optionally, the inflatable bladder 200 is brightly colored, includes a visual indicator or the like to mark the location of the personal vehicle 500 or person the recovery device 100 is coupled to. In one example, the drag of the inflatable bladder 200 within the material slide 800 substantially prevents a cartwheeling effect of the personal vehicle 500, a safety concern for riders of the personal vehicle 500. The inflatable bladder 200 moves to the upper surface 804 of the material slide 800 and drags through the material slide 800 like an anchor to slow the movement of the vehicle 500 and substantially prevent cartwheeling.

Figure 9:
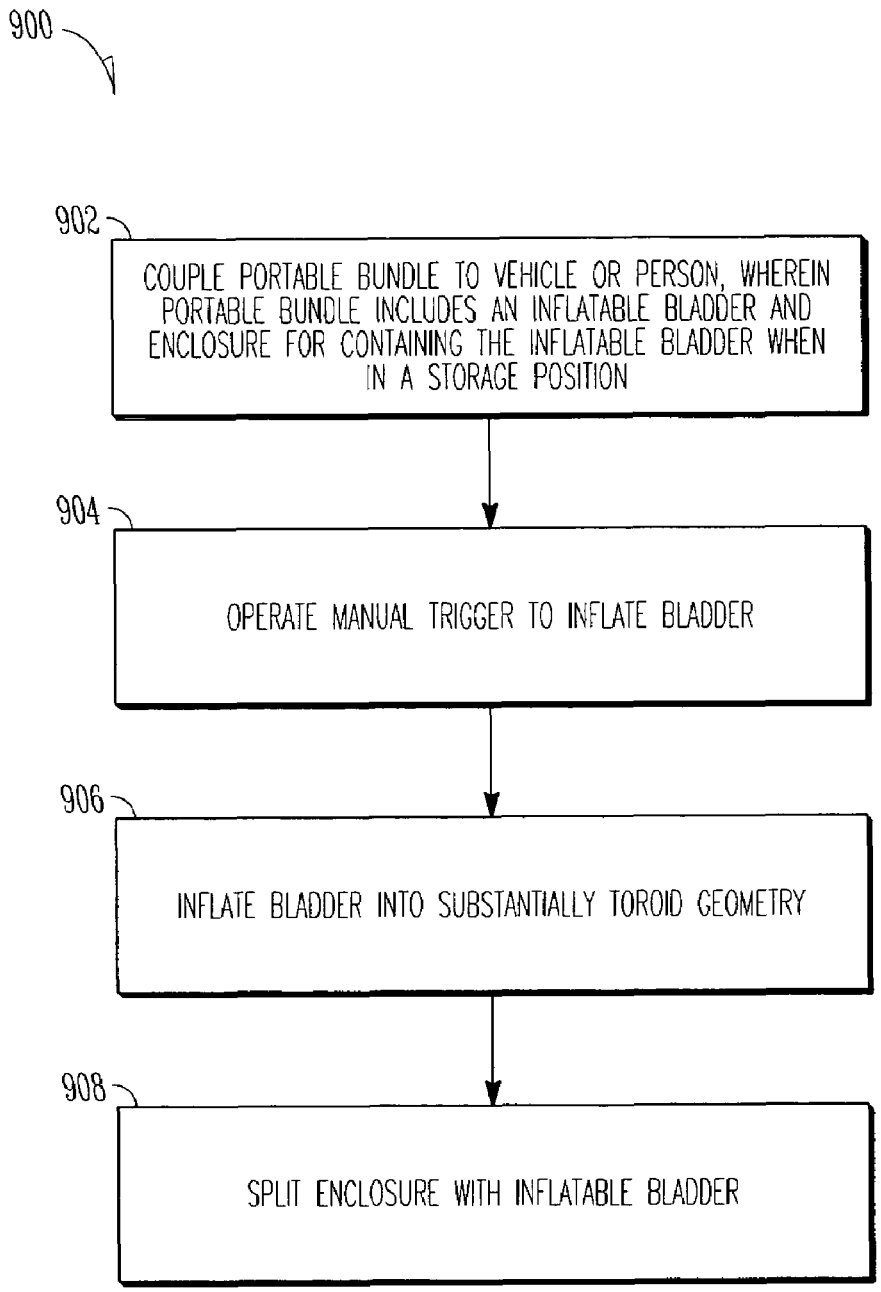
FIG. 9 is a block diagram illustrating one example of a method for using a recovery device.

In another example, the recovery device 100 is used by a person (i.e. driver, passenger or the like) in a material slide 800. The inflated bladder 200 including the orifice 600 provides drag and helps to slow the movement of the person with respect to the slide material. As described above, the inflatable bladder 200 moves to the upper surface 804 and rides on the upper surface 804 of the material slide 800. When coupled to a person, the inflatable bladder, in one example, suspends the person just below the upper surface 804 by the tether 114. Optionally, the drag of the inflatable bladder 200 pulls the person away from the personal vehicle 500 reducing the risk of injury from a collision with the vehicle 500 during the slide. In yet another example, recovery devices 100 are used with the personal vehicle 500 and a person FIG. 9 is a block diagram for a method 900 of using the recovery device 100 described herein. At 902, the portable bundle 102 (FIG. 1) is coupled to a personal vehicle or a person. The portable bundle 102 includes the inflatable bladder 200 (FIG. 2). The inflatable bladder 200 is in a storage position (e.g. a folded orientation) and disposed within an enclosure, such as the pouch 104. The personal vehicle 500 with the recovery device 100 including the portable bundle 102 is driven, for instance, onto an ice covered body of water, overland or the like. In another example, the person moves onto ice or overland with the recovery device 100. At 904, the manual trigger 106 is operated to inflated the inflatable bladder 200. The manual trigger 106 is operated, for example, where the personal vehicle or person breaks through the ice or is caught in a material slide (e.g. avalanche, mud slide or the like). At 906, the inflatable bladder 200 inflates into a substantially toroid geometry (FIGS. 6 and 7). At 908, the enclosure (i.e. pouch 104 or the like) is split by the inflatable bladder 200 allowing the inflatable bladder 200 to fully assume the substantially toroid shape. In one example, the enclosure is split along at least one seam 306 (FIG. 3).

In another example, the recovery device 100 is coupled to a personal vehicle 500 or person and is taken overland into an avalanche zone or the like. The recovery device 100 is used in a slide of material 800 (e.g. avalanche, mud slide or the like) to suspend the personal vehicle 500 within the slide of material with the inflated bladder 200. Suspending the personal vehicle 500 within the slide of material 800 aids in preventing cartwheeling of the vehicle. Preventing cartwheeling of the personal vehicle 500 reduces the risk of injury to drivers and riders from the vehicle during a material slide condition. Suspending the personal vehicle 500 within the material slide 800 includes, in yet another example, dragging the inflatable bladder 200 with moving material such as slide material 802. An orifice 600 in the inflatable bladder 200 fills with the slide material 802 to increase the drag on the bladder 200 and slow movement of the vehicle. In still another example, the recovery device 100 is coupled to a person and the person is suspended within the material slide 800 when the bladder 200 is inflated. In another option, the orifice 600 fills with slide material 802 to increase the drag of the bladder 200 and slow movement of the person.

Several options for the method 900 follow. Inflating the inflatable bladder 200, in one option, includes puncturing the gas canister 204 (FIG. 2) that is in communication with the inflatable bladder 200. In another option, operating the manual trigger 106 to inflate the bladder 200 is performed by pulling a rip cord 110 (FIG. 1) to puncture the gas canister 204.

Figure 10:
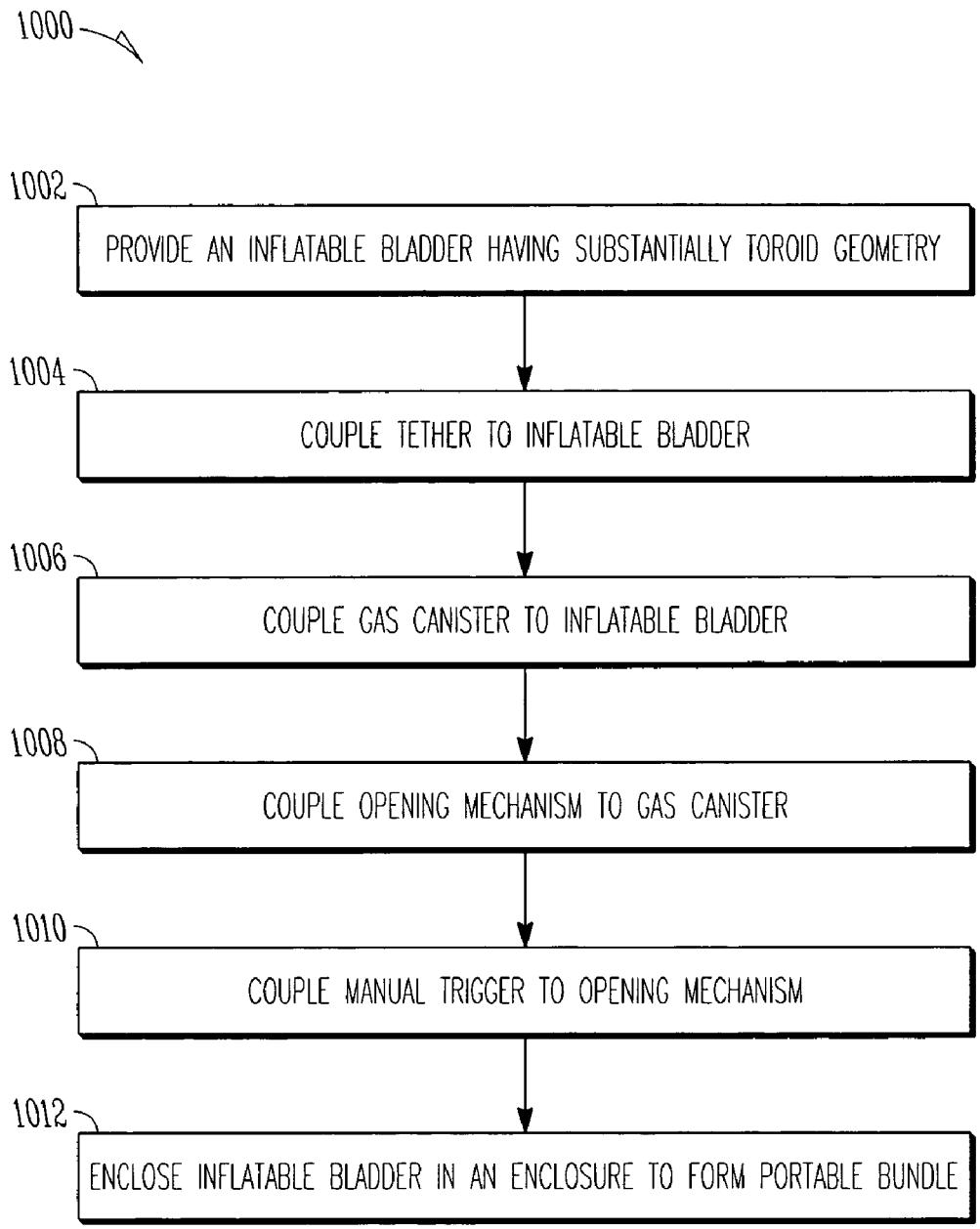
FIG. 10 is a block diagram illustrating one example of a method for making a recovery device in accordance with one embodiment.

FIG. 10 is a block diagram for a method 1000 of making a recovery device (for example recovery device 100 shown in FIG. 1). At 1002, an inflatable bladder 200 (FIG. 2) is provided and the bladder 200 has a substantially toroid geometry when inflated. At 1004, a tether 114 (FIG. 1) is coupled to the inflatable bladder 200. In one option, a carabiner 116 is coupled to the tether 114. At 1006, the gas canister 204 (FIG. 2) is coupled to the inflatable bladder 200. At 1008, the opening mechanism 206 is coupled to the gas canister 204. In one example, the opening mechanism 206 and fitting 208 (FIG. 2) provide communication between the gas ganister 204 and the inflatable bladder 200. The opening mechanism 206 includes, in another example, a needle 420 disposed substantially adjacent to the gas canister 204. At 1010, a manual trigger 106, for example a rip cord 110 and pull ring 108, is coupled to the opening mechanism. In another example, at least a portion of the rip cord 110 is coupled to the enclosure. The pull ring 108 is optionally coupled to the enclosure with hook and loop material. In still another example, the manual trigger 106 is coupled to a moveable arm and the arm is engaged against the needle 420. At 1012, the inflatable bladder 200 is enclosed in an enclosure (e.g. pouch 104) to form a portable bundle 102 (FIG. 1). In one option, the method 1000 includes coupling straps 300 (FIG. 3) to the enclosure and the straps 300 are dimensioned and configured to couple the portable bundle 102 to a person or personal vehicle 500.

In yet another example, enclosing the inflatable bladder 200 in the enclosure includes fastening a seam (e.g. seam 306) together to substantially enclose the bladder 200. Optionally, the seam 306 is fastened together with hook and loop material. In another option, the inflatable bladder 200 is folded into a storage position and enclosed in the enclosure to form the portable bundle 102.

CONCLUSION

The emergency flotation and recovery device is a relatively light and compact device that can be quickly moved and coupled to a vehicle or person for use in a rescue situation. The inflatable bladder, gas canister, and the opening mechanism are stored within an enclosure (e.g. a pliable pouch) as a portable bundle. A tether is coupled to the inflatable bladder that is quickly couplable to a person, or a personal vehicle (e.g. all terrain vehicle (ATV), snow mobile, or the like). Straps are included, in one option, for releasable coupling to the person or personal vehicle. The recovery device does not need to be removed from a storage case or installed on a vehicle for use. When needed, the inflatable bladder is inflated by pulling a manual trigger such as a rip cord. As the inflatable bladder expands it splits apart the enclosure of the portable bundle to assume the substantially toroid geometry and suspend the vehicle or person within a liquid or solid material (e.g. snow in an avalanche).

In one example, the inflatable bladder floats within a break in ice while the personal vehicle is suspended below. In another example, a person or persons can climb through the orifice of the toroid shaped bladder to get on top of the inflatable bladder and out of the water. In still another example, the personal vehicle serves as a sea anchor, when suspended by the inflatable bladder, to substantially prevent undesirable sideway motion of the inflatable bladder while a person attempts to climb onto the bladder. In yet another example, the orifice of the toroid inflatable bladder fills with avalanche material (snow, mud or the like) and provides drag to the vehicle or person. In one option, the drag of the inflatable bladder substantially prevents cartwheeling of the vehicle during a material slide (e.g. avalanche or mud slide). Cartwheeling of the vehicle creates a risk of collisions between people (i.e. drivers and riders) and the vehicle. This cartwheeling effect is greatly decreased by the drag of the inflatable bladder.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

It is to be understood that the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present application. The scope of the invention should, therefore, be determined with reference to the appended claims, along with the full scope of equivalents to which such claims are entitled.

What is claimed is:

1. An apparatus comprising:
   a portable bundle including:
   an inflatable bladder having a ring geometry, wherein the inflatable bladder includes an orifice sized and shaped to permit movement of a person through the inflatable bladder, and the inflatable bladder is in a storage position, a gas canister coupled with the inflatable bladder, and
an opening mechanism coupled to the gas canister, wherein at least a portion of the inflatable bladder envelops the gas canister and the opening mechanism;
a tether coupled to the inflatable bladder, wherein at least a portion of the tether includes a fastening clasp; and
a manual trigger coupled to the opening mechanism, wherein the manual trigger is operable to initiate inflation of the inflatable bladder.

2. The apparatus of claim 1, wherein the portable bundle includes a pouch and at least the inflatable bladder, the gas canister, and the opening mechanism are disposed within the pouch.

3. The apparatus of claim 2, wherein the pouch includes at least one seam, wherein the seam is dimensioned and configured to separate during inflation of the inflatable bladder.

4. The apparatus of claim 3, wherein the at least one seam is closed with hook and loop material.

5. The apparatus of claim 2, wherein straps extend from the pouch for removably coupling the portable bundle to a vehicle or person.

6. The apparatus of claim 5, wherein the straps include fasteners.

7. The apparatus of claim 6, wherein the fasteners include hook and loop material.

8. The apparatus of claim 1, wherein a web is removably coupled to the inflatable bladder and extends across at least a portion of the orifice.

9. The apparatus of claim 8, wherein the web is removably coupled to the inflatable bladder with hook and loop material.

10. The apparatus of claim 1, wherein the fastening clasp is a carabiner.

11. The apparatus of claim 1, wherein the manual trigger is a rip cord.

12. The apparatus of claim 1, wherein the opening mechanism includes a moveable pin substantially adjacent to the gas canister, and the moveable pin is operable to puncture the gas canister.

13. The apparatus of claim 12 wherein the manual trigger is coupled to the moveable pin by a moveable arm, and the moveable arm is coupled at one end to the manual trigger and engaged against the moveable pin at another end.

14. An apparatus comprising:
a portable bundle including:
an inflatable bladder having a ring geometry, wherein the inflatable bladder includes an orifice sized and shaped to permit movement of a person through the inflatable bladder, and the inflatable bladder is in a storage position,
a gas canister coupled with the inflatable bladder,
a moveable pin substantially adjacent to the gas canister, wherein the moveable pin is operable to puncture the gas canister, and
an enclosure for bundling at least the inflatable bladder, the gas canister, and the moveable pin;
a tether coupled to the inflatable bladder and extending through the enclosure, wherein at least a portion of the tether includes a fastening clasp configured to releasably couple the portable bundle with a vehicle or person; and
a manual trigger coupled to the moveable pin and releasably retained along an exterior of the enclosure, wherein the manual trigger is operable to initiate inflation of the inflatable bladder.

15. The apparatus of claim 14 wherein the enclosure includes a pouch.

16. The apparatus of claim 15 wherein the pouch includes at least one seam, wherein the seam is dimensioned and configured to separate during inflation of the inflatable bladder.

17. The apparatus of claim 14 wherein the enclosure is pliable.

18. The apparatus of claim 14 wherein straps extend from the enclosure for removably coupling the portable bundle to a vehicle or person.

19. The apparatus of claim 18, wherein the straps include fasteners.

20. The apparatus of claim 19, wherein the fasteners include hook and loop material.

21. The apparatus of claim 14, wherein the fastening clasp is a carabiner.

22. The apparatus of claim 14, wherein the manual trigger is a rip cord.

23. The apparatus of claim 14, wherein the manual trigger is coupled to the moveable pin by a moveable arm, and the moveable arm is coupled at one end to the manual trigger and engaged against the moveable pin at another end.

24. The apparatus of claim 14, wherein a web is removably coupled to the inflatable bladder and extends across at least a portion of the orifice.

25. The apparatus of claim 24 wherein the web is removably coupled to the inflatable bladder with hook and loop material.

26. A method comprising:
providing an inflatable bladder having a substantially ring geometry including an orifice sized and shaped to permit movement of a person through the inflatable bladder;
coupling a tether to the inflatable bladder;
coupling a gas canister to the inflatable bladder;
coupling an opening mechanism to the gas canister;
coupling a manual trigger to the opening mechanism;
enveloping the gas canister and the opening mechanism with the inflatable bladder; and
enclosing the inflatable bladder in an enclosure to form a portable bundle.

27. The method of claim 26, further comprising coupling straps to the enclosure for coupling the portable bundle to a person or vehicle.

28. The method of claim 26, wherein coupling the manual trigger to the opening mechanism includes coupling a rip cord to the opening mechanism.

29. The method of claim 28, further comprising removably coupling at least a portion of the rip cord to the enclosure.

30. The method of claim 29, wherein removably coupling at least the portion of the rip cord to the enclosure includes coupling a pull ring to the enclosure with hook and loop material.

31. The method of claim 26, further comprising coupling a carabiner to the tether.

32. The method of claim 26, wherein enclosing the inflatable bladder in the enclosure to form a portable bundle includes fastening a seam together to substantially enclose the inflatable bladder.

33. The method of claim 28 wherein fastening the seam together includes fastening hook and loop material together.

34. The method of claim 26, wherein enclosing the inflatable bladder in the enclosure to form the portable bundle includes folding the inflatable bladder into a storage position.

35. The method of claim 26, wherein coupling the opening mechanism to the gas canister includes disposing a pin substantially adjacent to the gas canister.

36. The method of claim 35, wherein coupling the manual trigger to the opening mechanism includes coupling the manual trigger to a moveable arm and the arm is engaged against the pin.

37. The method of claim 26, further comprising removably coupling a web across at least a portion of the orifice.

38. The method of claim 37, wherein removably coupling a web across at least a portion of the orifice includes removably coupling the web to the inflatable bladder with hook and loop material.

39. An apparatus comprising:
   a portable bundle including:
      an inflatable bladder having a ring geometry, wherein the inflatable bladder includes an orifice sized and shaped to permit movement of a person through the inflatable bladder, and the inflatable bladder is in a storage position,
      a gas canister coupled with the inflatable bladder,
      a moveable pin substantially adjacent to the gas canister, wherein the moveable pin is operable to puncture the gas canister,
      wherein at least a portion of the inflatable bladder envelops the gas canister and the moveable pin, and
      an enclosure for bundling at least the inflatable bladder, the gas canister, and the moveable pin;
   a tether coupled to the inflatable bladder and extending through the enclosure, wherein at least a portion of the tether includes a fastening clasp configured to releasably couple the portable bundle with a vehicle or person; and
   a rip cord coupled to the moveable pin and releasably retained along an exterior of the enclosure, wherein the rip cord is operable to initiate inflation of the inflatable bladder.

40. The apparatus of claim 39, wherein the enclosure includes a pouch.

41. The apparatus of claim 40, wherein the pouch includes at least one seam, and the seam is dimensioned and configured to separate during inflation of the inflatable bladder.

42. The apparatus of claim 39, wherein straps extend from the enclosure for removably coupling the portable bundle to a vehicle or person.

43. The apparatus of claim 39, wherein a web is removably coupled to the inflatable bladder and extends across at least a portion of the orifice.

44. The apparatus of claim 43, wherein the web is removably coupled to the inflatable bladder with hook and loop material.

45. The apparatus of claim 39, wherein the fastening clasp is a carabiner.

46. The apparatus of claim 39, wherein a second portion of the tether between the enclosure and the inflatable bladder is secured in place in the storage position.

47. The apparatus of claim 46, wherein at least the enclosure is releasably fastened to the second portion of the tether.

* * * * *

UNITED STATES PATENT AND TRADEMARK OFFICE
CERTIFICATE OF CORRECTION

PATENT NO. : 7,083,487 B2 Page 1 of 1
APPLICATION NO. : 10/817451
DATED : August 1, 2006
INVENTOR(S) : Weinel It is certified that error appears in the above-identified patent and that said Letters Patent is hereby corrected as shown below:

In column 8, lines 46-67, delete "FIG. 9 is a block diagram for a method 900----------------------------along at least one seam 306 (FIG. 3)." and insert the same as new paragraph on line 47.

In column 11, line 42, in Claim 13, after "12" insert -- , --.

In column 12, line 1, in Claim 15, after "14" insert -- , --.

In column 12, line 3, in Claim 16, after "15" insert -- , --.

In column 12, line 7, in Claim 17, after "14" insert -- , --.

In column 12, line 9, in Claim 18, after "14" insert -- , --.

In column 12, line 28, in Claim 25, after "24" insert -- , --.

In column 12, line 66, in Claim 33, delete "28" and insert -- 32, --, therefor.

Signed and Sealed this

Twenty-eighth Day of October, 2008

JON W. DUDAS
*Director of the United States Patent and Trademark Office*